(12) United States Patent
Kemp et al.

(10) Patent No.: US 9,298,809 B2
(45) Date of Patent: Mar. 29, 2016

(54) SYSTEM, APPARATUS, AND METHOD FOR RECOMMENDING ITEMS

(71) Applicant: SONY CORPORATION, Tokyo (JP)

(72) Inventors: Thomas Kemp, Esslingen (DE); Naoki Kamimaeda, Tokyo (JP); Masanori Miyahara, Tokyo (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 13/837,508

(22) Filed: Mar. 15, 2013

(65) Prior Publication Data

US 2013/0262478 A1 Oct. 3, 2013

(30) Foreign Application Priority Data

Mar. 30, 2012 (EP) .................................... 12002323

(51) Int. Cl.
*G06F 17/30* (2006.01)
*G06Q 30/02* (2012.01)

(52) U.S. Cl.
CPC .......... *G06F 17/30663* (2013.01); *G06Q 30/02* (2013.01)

(58) Field of Classification Search
CPC .......... G06F 17/30867; G06F 17/3089; G06F 17/30994; G06F 17/30864; G06F 9/541; G06F 17/30539; G06F 17/30699; G06F 17/30997

See application file for complete search history.

(56) References Cited

U.S. PATENT DOCUMENTS

| | | | |
|---|---|---|---|
| 7,085,747 B2 * | 8/2006 | Schaffer | H04N 7/163 348/E7.061 |
| 7,584,171 B2 | 9/2009 | Guan et al. | |
| 7,590,616 B2 | 9/2009 | Guan et al. | |
| 7,774,335 B1 * | 8/2010 | Scofield et al. | 707/709 |
| 8,073,848 B2 | 12/2011 | Aravamudan et al. | |
| 8,126,794 B2 * | 2/2012 | Lange et al. | 705/36 R |
| 8,793,314 B2 * | 7/2014 | Spivak | G06Q 10/02 705/319 |
| 2007/0118498 A1 * | 5/2007 | Song et al. | 707/1 |
| 2008/0288889 A1 * | 11/2008 | Hunt et al. | 715/810 |
| 2009/0030829 A1 * | 1/2009 | Chatter et al. | 705/37 |
| 2010/0082419 A1 | 4/2010 | Au-Yeung et al. | |
| 2010/0185579 A1 | 7/2010 | Hong et al. | |
| 2010/0199218 A1 * | 8/2010 | Farrelly | H04L 67/306 715/820 |
| 2010/0235241 A1 * | 9/2010 | Wang | G06Q 30/02 705/14.66 |
| 2011/0055725 A1 * | 3/2011 | Folgner | G06F 3/0486 715/753 |
| 2012/0259842 A1 * | 10/2012 | Oman | G06Q 30/02 707/722 |

OTHER PUBLICATIONS

Andrew Walker, et al., "Collaborative Information Filtering: a review and an educational application", International Journal of Artificial Intelligence in Education 14, 2004, IOS Press. pp. 1-26.

* cited by examiner

*Primary Examiner* — Angelica Ruiz
(74) *Attorney, Agent, or Firm* — Oblon, McClelland, Maier & Neustadt, L.L.P.

(57) ABSTRACT

Recommending one or more items among a plurality of items to a first user by generating a weighted data set by applying a weight factor to each of a plurality of user event data sets each derived from a previous user event of a second user of the recommendation system. Each of the user event data sets includes a user identifier of the second user, an item identifier of an item involved in the previous user event, and time information regarding a time of the previous user event. The weight factor is derived from the time information of the corresponding previous user event. One or more recommended items are determined based on an algorithm using the weighted data set.

11 Claims, 7 Drawing Sheets

FIG. 2A  exponential:
$W_{kl} \sim \exp\{-\beta(t_c - t_m)\}$
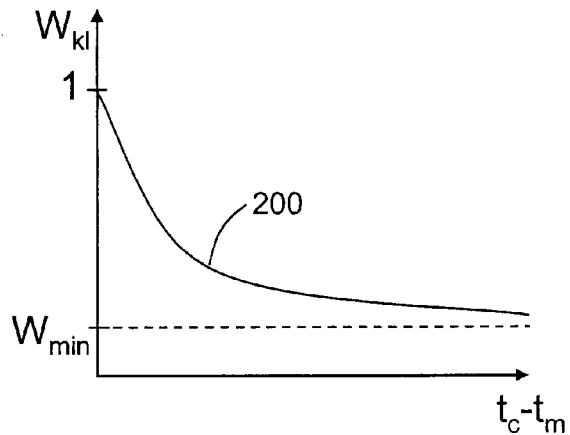
FIG. 2B  linear:
$W_{kl} \sim (t_c - t_m)$
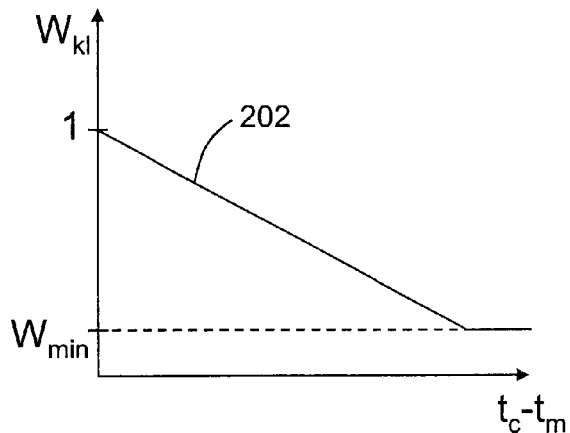
FIG. 2C  rank-based:
| | | |
|---|---|---|
| last user event: | $W_{kl} = 1$ | $= (0.9)^0$ |
| second to last user event: | $W_{kl} = 0.9$ | $= (0.9)^1$ |
| third to last user event: | $W_{kl} = 0.81$ | $= (0.9)^2$ |
| fourth to last user event: | $W_{kl} = 0.729$ | $= (0.9)^3$ |
| ⋮ | ⋮ | ⋮ | after application of weight factors $W_{kl}$
based on the time information $t_m$ user events
$(u_k, i_l, t_m)$:

$(u_3, i_3, t_1)$
$(u_5, i_4, t_2)$
$(u_6, i_3, t_3)$
$(u_3, i_5, t_4)$
$(u_5, i_5, t_5)$
$(u_3, i_6, t_6)$
$(u_5, i_7, t_7)$
$(u_6, i_1, t_8)$
⋮

402

0.81 | 0.9 | 1

0.81 | 0.9 | | 1

1 | 0.9

$\underline{N_{kl}}$

300

400

$(t_1 < t_2 < \ldots < t_7 < t_8)$

FIG. 4

SYSTEM, APPARATUS, AND METHOD FOR RECOMMENDING ITEMS

CROSS REFERENCE TO RELATED APPLICATIONS

The present application claims priority under 35 U.S.C. §119 to European Application 12 002 323.9, filed on Mar. 30, 2012, the content of which is incorporated herein by reference in its entirety.

BACKGROUND

1. Field of the Disclosure

The present disclosure relates to a method for recommending one or more items among a plurality of items, a recommendation system, and a computer program.

2. Description of Related Art

Nowadays, users of (for example) online shops (e.g., online bookstores or online music stores) face an almost unmanageable offer of items in the shop's database. In order to assist the users by providing lists of recommended items, recommendation systems have been developed using collaborative filtering methods.

Recommendation systems based on collaborative filtering typically use the purchase history of their users to estimate recommendations for current users. However, the accuracy of the resulting recommendations is limited. It is desirable to improve the accuracy of such a collaborative filtering recommendation system.

SUMMARY

A method for recommending one or more items among a plurality of items to a first user of a recommendation system is provided, the method comprising: generating a weighted data set by applying a weight factor to each of a plurality of user event data sets each derived from a previous user event of a second user of the recommendation system, wherein each of said user event data sets comprises a user identifier of the second user, an item identifier of an item involved in the previous user event, and time information on the time of the previous user event, and wherein the weight factor is derived from the time information of the corresponding previous user event; and determining the one or more recommended items based on an algorithm using the weighted data set.

A recommendation system is described, comprising: a processor to generate a weighted data set by applying a weight factor to each of a plurality of user event data sets each derived from a previous user event of a second user of the recommendation system, wherein each of said user event data sets comprises a user identifier of the second user, an item identifier of an item involved in the previous user event, and time information on the time of the previous user event, and wherein the weight factor is derived from the time information of the corresponding previous user event; and to determine the one or more recommended items based on an algorithm using the weighted data set; and a memory to store the plurality of user event data sets.

Further, a computer program including computer-program instructions is provided, which, when executed by a computer, cause the computer to perform a method comprising: generating a weighted data set by applying a weight factor to each of a plurality of user event data sets each derived from a previous user event of a second user of a recommendation system, wherein each of said user event data sets comprises a user identifier of the second user, an item identifier of an item involved in the previous user event, and time information on the time of the previous user event, and wherein the weight factor is derived from the time information of the corresponding previous user event; and determining the one or more recommended items based on an algorithm using the weighted data set.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A illustrates how the weight factor W can be derived from an exponential function according to an embodiment of the present disclosure;

FIG. 2B illustrates how the weight factor W can be derived from a linear function according to an embodiment of the present disclosure;

FIG. 2C illustrates how the weight factor W can be derived rank-based from an order of previous user events according to an embodiment of the present disclosure;

FIG. 4 is a representation of a plurality of user event data sets and a corresponding weighted user event matrix according to an embodiment of the present disclosure;

DETAILED DESCRIPTION

Figure 1A:
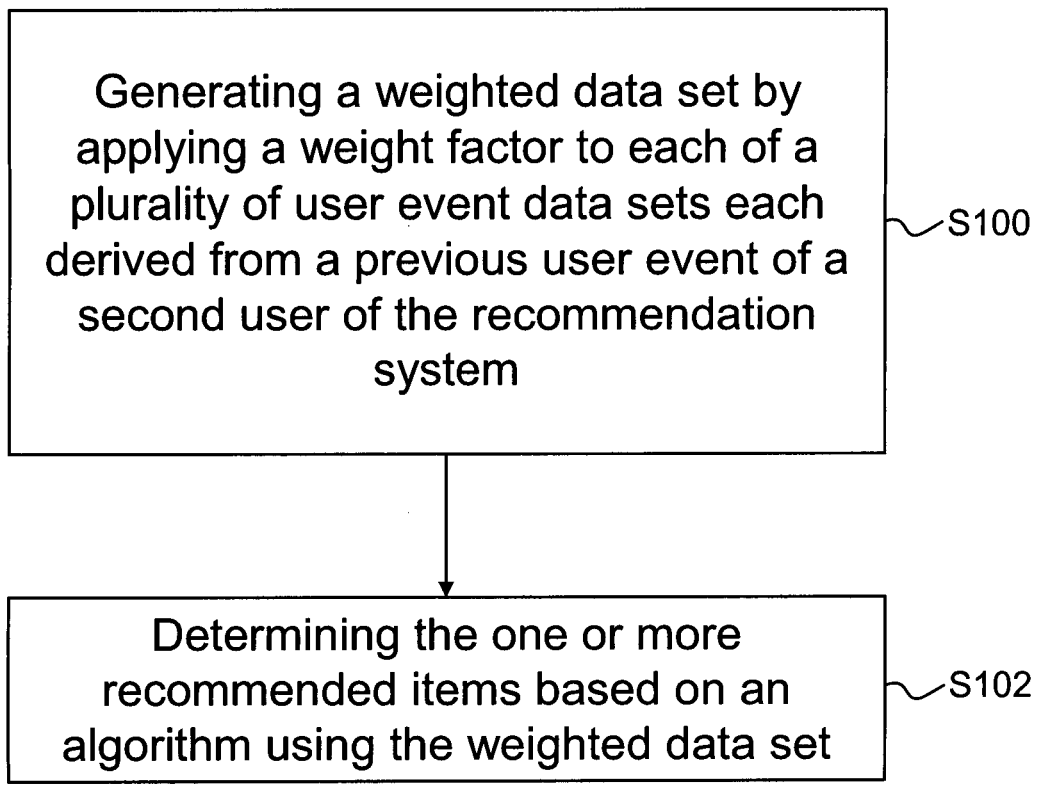
FIG. 1A is a schematic flowchart of the steps of recommending one or more items among a plurality of items to a first user of a recommendation system according to an embodiment of the present disclosure.

Referring now to the drawings, wherein like reference numerals designate identical or corresponding parts throughout the several views, FIG. 1A shows a flowchart of the steps of recommending one or more items among a plurality of items to a first user of a recommendation system according to an embodiment of the present disclosure.

The first user (or current user) of the recommendation system can be a user of an online service like an online shop or the like, who already bought a couple of items in the shop and who shall be provided with a list of recommended items of the shop. The first user can also be a user of an online music or video streaming service or an online download portal or another service in which recommendation systems are typically utilized.

The plurality of items can be a large defined set of items (e.g., some thousands), wherein each item of the plurality of items may be clearly identified for example by a number l. In the following, the total amount of items in the set of items is denoted $i_{tot}$. New items may enter the set of items and old (e.g., sold-out) items may leave the set.

The first user can be one of a plurality of users of the recommendation system. The plurality of users can be a large defined set of users (e.g., some thousands), wherein each user of the plurality of users can be clearly identified for example by a number k (e.g., a user identifier). In the following, the total amount of users in the set of users is denoted $u_{tot}$. New users may enter the set of users and old users may leave the set, for example by terminating their membership of an online service.

In a step S100, a weighted data set is generated by applying a weight factor to each of a plurality of user event data sets each derived from a previous user event of a second user of the recommendation system. Each of the user event data sets comprises a user identifier of the second user, an item identifier of an item involved in the previous user event, and time information on the time of the previous user event. The weight factor is derived from the time information of the corresponding previous user event.

The previous user event of a second user might be a purchase event, a download event, or a streaming event, or the like, of a second user of the recommendation system. The second user can be the same user as the first user $u_c$ (or current user) of the recommendation system to whom a list of recommended items shall be presented or another user. For each of the previous user events, a user event data set is created which can be stored in a user event database, for example, in a user event matrix.

Each of the user event data sets can be a data triplet $(u_k, i_1, t_m)$ including a user identifier of the second user $u_k$, an item identifier of an item $i_1$ involved in the previous user event, and time information on the time $t_m$ of the previous user event. In the user event, the second user $u_k$ purchased (or downloaded, or the like) the item $i_1$ at the time $t_m$.

The second user $u_k$ can be one of the plurality of users of the recommendation system. The user identifier might comprise a user ID (user identification identifier) k of the second user $u_k$, by means of which the second user $u_k$ is unambiguously identifiable in the set of users.

The item $i_1$ can be the item purchased (or downloaded, or the like) in the previous user event. The item $i_1$ can be one of the plurality of items. The item identifier can comprise the number l of the item $i_1$, by means of which the item $i_1$ is unambiguously identifiable in the set of items.

The time information can be a time stamp indicating date and time of the previous user event (purchase, download, or the like). The time information can also be a number indicating a rank of the item $i_1$ in a list of previous user events for the second user $u_k$. The rank might describe the order in which the second user purchased (downloaded, etc.) the items.

A user event database can be generated based on the plurality of user event data sets, wherein the user event database can include a user event matrix $M_{kl}$ (see FIG. 3 and the corresponding description below). The user event matrix $M_{kl}$ can be a $u_{tot} \times i_{tot}$ matrix, wherein $u_{tot}$ and $i_{tot}$ denote the total amount of users and items in the sets of users and items, respectively.

For each user event $(u_k, i_1, t_m)$, a '1' is written into the matrix at the position (k,l), while all other entries of the user event matrix $M_{kl}$ may be '0'. Accordingly, each user $u_k$ has a user event vector (represented by the $k^{th}$ row of the matrix $M_{kl}$) indicating with '1''s which items the user has already purchased (see FIG. 3).

Back to FIG. 1A, in step S100, a weighted data set is generated by applying a weight factor $W_{kl}$ to each of the user event data sets, wherein the weight factor $W_{kl}$ is derived from the time information $t_m$ of the corresponding previous user event.

Hence, for each of the plurality of previous user events, a weight factor $W_{kl}$ is derived from the time information $t_m$ of the corresponding user event represented by the corresponding user event data set $(u_k, i_1, t_m)$.

The weighted data set can be a database or weighted user event matrix $N_{kl}$ which is derived from the user event matrix $M_{kl}$ by multiplying a plurality of scalar weight factors $W_{kl}$ to the corresponding entries at the positions (k,l). In the case described above, where a '1' is written into the matrix $M_{kl}$ for each purchase event of item $i_1$ by user $u_k$, the matrix $M_{kl}$ may consist only of '0''s and '1''s. Hence, by multiplying a weight factor $W_{kl}$ to each user event data set (represented by a '1' in the matrix $M_{kl}$), the '1''s are multiplied with the corresponding weight factors $W_{kl}$ (also see description of FIG. 4 below). Accordingly, "applying a weight factor to each of the user event data sets" can mean applying a plurality of weight factors to a plurality of matrix entries each representing a corresponding user event data set.

The weight factor $W_{kl}$ can be derived from the time information $t_m$, by a variety of possible methods. Some of these methods will be described below in the description of FIGS. 2A-2C. In general, the weight factor $W_{kl}$ can be determined by a function of the time information $t_m$ of the corresponding user event data set $(u_k, i_1, t_m)$.

In step S102 of the method shown in FIG. 1A, one or more recommended items are determined based on an algorithm using the weighted data set.

Figure 1B:
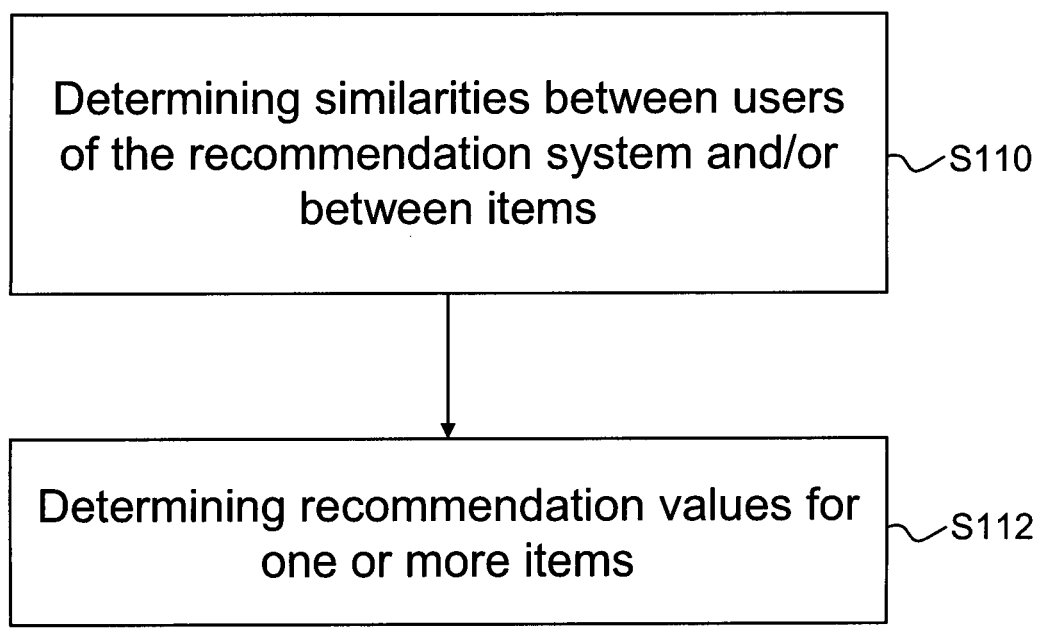
FIG. 1B is a schematic flowchart for an embodiment of determining items based on an algorithm, according to an embodiment of the present disclosure.

In FIG. 1B, it is depicted that the recommended items can be determined using an algorithm which comprises a step S110 of determining similarities between users of the recommendation system and/or between items among the plurality of items and a step S112 of determining recommendation values for one or more items based on the similarities and based on the weighted data set.

Collaborative filtering based recommendation systems are either user to user or item to item based. They rely on past purchases: user $u_k$ has purchased item $i_1$ on time instance $t_m$. Therefore, the input to a collaborative filtering recommendation system is a large list of data triplets (u,i,t).

To compute a set of recommendations to a known first user $u_c$, the following steps may be performed in user to user recommendation:

First, the 'friends' of user $u_c$ are determined. They form a set of, for example, a couple of hundred other users which have a similar taste or purchase history to first user $u_c$. The closeness (similarity) of two users is computed by computing the scalar product of their corresponding purchase vectors (where the two purchase vectors might each be normalized to one). A users' purchase vector is the vector that contains as many dimensions as there are items i and contains a '1' if the user purchased this item, else a zero. The vectors are typically very sparse, and most scalar products come out to zero. The scalar product (similarity) can have its maximum value, if the two users purchased exactly the same items.

Then, the purchases of all the 'friends' are analyzed. Items that have been frequently purchased by the collection of 'friends' represent the recommendations for user $u_c$. Each item gets a 'vote' every time a 'friend' has purchased it. Items i with the highest number of votes are the final recommended items.

In practice, not all 'friends' count the same. Closer 'friends' having a higher similarity value are given a higher vote (e.g., vote=0.9) than more distant friends having a lower similarity value (e.g., vote=0.7). Then, a purchase of item i from a close 'friend' would count 0.9 towards that item i, while a purchase from a more distant friend would, for example, only count 0.7.

FIGS. 2A-2C show three different methods of determining the weight factor $W_{kl}$ as a function of the time information $t_m$ of the corresponding user event data set $(u_k,i_1,t_m)$. However, deriving the weight factor $W_{kl}$ from the time information of the corresponding previous user event is not limited to these three methods, and a variety of other methods may be implemented to determine the weight factor W for each of the user event data sets $(u_k,i_1,t_m)$ based on the corresponding time information $t_m$.

FIG. 2A shows an exponential dependency between the weight factor $W_{kl}$ and the time information $t_m$ described by the following equation: $W \sim \exp\{-\beta(t_c-t_m)\}$. Here, $\beta$ denotes a factor that can be determined experimentally dependent on the specific features of the used recommendation system. Further, $t_c$ describes a current time (now). Hence, $t_c-t_m$ is a measure for recency describing a time difference between the purchase time (time of the user event) $t_m$ and the current time $t_c$.

The corresponding exponential curve 200 is shown in the right hand part of FIG. 2A. Accordingly, very recent events $(t_m \approx t_c)$ have a high weight factor $W_{kl}$ close to 1, wherein older events have a lower weight factor $W_{kl}$ closer to zero.

The value of the weight factor $W_{kl}$ can have a lower limit. Hence, there may be defined a lower limit $W_{min}$ (indicated by the dashed line in FIG. 2A) below which the weight factor $W_{kl}$ cannot fall, even if $t_c-t_m$ becomes very large. An exponential dependency may be used for recommendation systems in which recent events are extraordinarily important compared to older events in the past.

FIG. 2B shows a linear dependency between the weight factor $W_{kl}$ and the time information $t_m$ described by the following equation: $W \sim (t_c-t_m)$. Again, $t_c-t_m$ is a measure for recency describing a time difference between the purchase time (time of the user event) $t_m$ and the current time $t_c$.

The corresponding linear curve 202 is shown in the right hand part of FIG. 2B. Similar to the exponential case, more recent user events have a higher weight factor $W_{kl}$ (closer to 1) than older user events in the past.

Also in the case of a linear dependency, the value of the weight factor $W_{kl}$ might have a lower limit. Hence, there may be defined a lower limit $W_{min}$ (indicated by the dashed line in FIG. 2B) below which the weight factor $W_{kl}$ cannot fall, even if $t_c-t_m$ becomes very large.

FIG. 2C shows a rank-based function of deriving the weight factor $W_m$ from the time information of the corresponding previous user event. Here, the last purchase (last user event) of the second user $u_k$ e.g., gets a weight factor $W_{kl}$ of '1'(=$(0.9)^0$), the second to last purchase (second to last user event) gets a weight factor $W_{kl}$ of '0.9'(=$(0.9)^1$), the third to last purchase (third to last user event) gets a weight factor $W_{kl}$ of '0.81'(=$(0.9)^2$), and so forth. Accordingly, the $n^{th}$ to last user event gets a weight factor $W_{kl}$ of $(0.9)^{n-1}$. However, this method of obtaining the weight factor $W_m$ by a rank-based function is not limited to the number 0.9. Any other number may be used according to the circumstances under which the recommendation system is utilized.

Such a rank-based function might be desirable for large datasets, since no actual time stamp has to be stored and the weight function $W_{kl}$ does not have to be permanently recalculated with changing current time $t_c$. In the rank-based approach, only the weight factors for a specific user $u_k$ change if this user performs a user event for example by purchasing an item $i_1$. Then, the weight factor for this event will be set to '1' and all other weight factors simply have to be multiplied by 0.9. In other words, the weighted user event vector of the user $u_k$ in the weighted user event matrix $N_{kl}$ simply has to be multiplied by 0.9 before a '1' is added for the most recent user event.

In some embodiments of the present application, a weight factor $W_{kl}$ is put to each of the data triplets $(u_k,i_1,t_m)$, wherein the weight factor $W_{kl}$ depends on the time $t_m$. The older a user event $(u_k,i_1,t_m)$ is, the smaller will be its weight.

Figure 3:
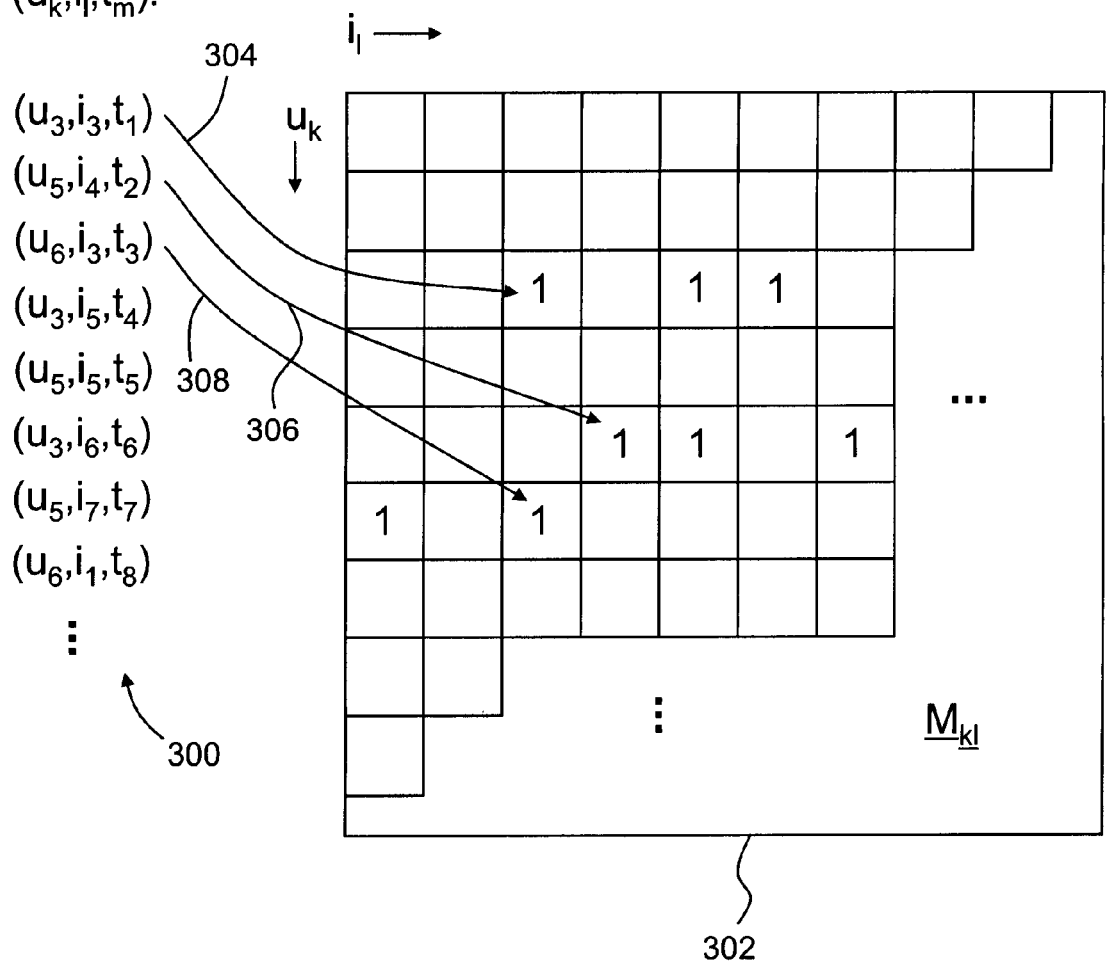
FIG. 3 is a representation of a plurality of user event data sets and a corresponding user event matrix according to an embodiment of the present disclosure.

FIG. 3 illustrates how a plurality of user events represented by a plurality of user event data sets 300 is integrated into a user event matrix $M_{kl}$ 302. In a real application, such a user event matrix $M_{kl}$ 302 can have dimensions of a couple of thousand in both the row direction (k) and the column direction (l), corresponding to the total number of users $u_{tot}$ and the total number of items $i_{tot}$, respectively. FIG. 3 exemplarily shows only a fraction of such a real user event matrix $M_{kl}$ 302.

In the following, an example is briefly discussed. At a first time $t_1$, user $u_3$ purchases item $i_3$. This user event is represented by the user event data set $(u_3,i_3,t_1)$. Accordingly, a '1' is written into the matrix $M_{kl}$ at the position (k=3, l=3), see arrow 304. The empty boxes of the matrix $M_{kl}$ represent zeros. Secondly, user $u_5$ purchases item $i_4$ at time $t_2$, represented by the user event data set $(u_5,i_4,t_2)$. Accordingly, a '1' is introduced into the matrix at the position (5, 4), see arrow 306. The next user event data set represents the event in which the user $u_6$ purchases item $i_3$ at time $t_3$. Accordingly, a '1' is written into the matrix $M_{kl}$ at the position (6, 3), see arrow 308. Further user events can occur, which are represented by the plurality of user event data sets 300. Their corresponding '1''s have been introduced into the user event matrix $M_{kl}$ of FIG. 3. In the example, user events with a higher index m occur at a later time $(t_1<t_2<\ldots<t_7<t_8)$. Thus, user event data set $(u_3,i_3,t_1)$ is the oldest one and user event data set $(u_6,i_1,t_8)$ is the most recent one in the list of user event data sets 300 shown in FIG. 4.

FIG. 4 shows the weighted user event matrix $N_{kl}$ 400 after weight factors $W_{kl}$ have been applied to the entries of the user event matrix $M_{kl}$ 302 of the example of FIG. 3. Several possibilities of determining these weight factors $W_{kl}$ have been described above in the description of FIGS. 2A-2C.

FIG. 4 illustrates the use of rank-based weight factors $W_{kl}$ as shown in FIG. 2C. Accordingly, for each user $u_k$, the last user event is represented by a '1' in the weighted user event matrix $N_{kl}$ 400. Further, second to last user events are represented by the value 0.9 and third to last user events by the value 0.81, respectively for each user $u_k$. Again, empty boxes of the matrix $N_{kl}$ represent zeros.

Now, in a further step, the weighted matrix $N_{kl}$ might be used for determining similarities between users of the recommendation system and/or between items among the plurality of items. In the following, it will be exemplarily described how 'friends' of a first user $u_c$ might be determined by finding similarities between the first user $u_c$ and the other users of the recommendation system.

Here, the first user $u_c$ (or current user) might be any user among the plurality of users of the recommendation system, to whom one ore more recommended items shall be presented. In the example of FIGS. 3 and 4, the first user $u_c$ might be for example the user $u_3$, who bought at least items $i_3$, $i_5$, and $i_6$, in this chronological order. Hence, the corresponding user event vector 402 of user $u_3$ is represented by row 3 of the weighted user event matrix $N_{kl}$: (0, 0, 0.81, 0, 0.9, 1, 0, ...). For determining the similarities between the first user $u_c$ and each of the other users $u_k$, the dot product of the user event vector of the first user $u_c$ and each of the user event vectors of the other users $u_k$ (wherein k≠c) might be calculated. The result of such a dot product might be called a similarity value.

For determining the similarity value, a dot product of normalized vectors might be calculated, such that each vector has a length (or norm) of 1. This may be realized by multiplying two vectors which are divided by their lengths, respectively. The results (similarity values) of these dot products may be between 0 and 1, depending on the similarity of the first user $u_c$ and the other user $u_k$ whose user event vector has been used for the multiplication.

However, the similarity value might also be calculated by a dot product of non-normalized vectors. In this case, the amount of purchases of the users might be taken into account.

If two users have similar interests, they may have purchased the same items $i_1$ at similar times. Accordingly, the dot product of their user event vectors may be close to 1 and these two users might be interpreted as 'friends'. A set of 'friends' can be identified for the first user $u_c$ based on the similarity values between $u_c$ and the other users $u_k$.

A threshold value can be set for the similarity value to define which user will be a 'friend' of $u_c$. If the dot product of a user event vector of a user $u_k$ and the user event vector of user $u_c$ results in a similarity value higher than the threshold value, then this user $u_k$ will be a 'friend' of the first user $u_c$. In a real application, a lot of dot products might be zero. This might be the case when two users have no purchased items in common.

As a result of this 'forgetting' method, the maximum similarity value of 1.0 of the first user $u_c$ and a 'friend' can only be achieved if both purchased exactly the same items $i_1$ at the same time. If another user purchased items $i_1$ in a different order, or purchased them much earlier or later, the similarity value will be reduced.

This effect is helpful, since in practice, an 'early adopter' user (e.g., a user who buys a product immediately after its release) is not very similar to a 'late follower' user (e.g., a user who buys a product long after other users, e.g., the 'early adopters', bought it), even if they both end up purchasing similar items.

However, according to an embodiment of the present disclosure, for the first step of finding 'friends', also the non-weighted user event matrix $M_{kl}$ may be used, which may consist only of '0''s and '1''s. In this case, the time of purchase is not taken into account and for the determination of the 'friends' of a user $u_c$, it is irrelevant when the user events took place.

In the next step of recommendation computation, 'votes' are given to each item $i_1$ that has been purchased by the set of 'friends'. The amount of these 'vote' values for each item $i_1$ can be determined by the weight factor $W_{kl}$ that has been determined (see above) for the user events of user $u_k$ purchasing item $i_1$. The total 'vote' value for an item $i_1$ can be calculated as the sum of the weight factors $W_{kl}$ of the corresponding item $i_1$ from the set of 'friends' of the user $u_c$. In the example of FIG. 4, the matrix elements of the weighted user event matrix $N_{kl}$ in each column (according to each item $i_1$) can be summarized in the rows corresponding to the 'friends' of user $u_c$.

Further, a similarity factor can be applied to each 'vote' given by a 'friend'. The similarity factor might represent the 'closeness' of a friend with regard to the first user $u_c$. Hence, the similarity value determined in the previous step can be used as a similarity factor. Further, any other dependency (e.g., a rank-based dependency) can be used to determine the 'closeness' of two friends during the step of giving 'votes'.

Accordingly, the total vote for one particular item $i_1$ can be derived as a sum of the matrix entries of weighted user event matrix $N_{kl}$ in the rows of 'friends' and in the column of the particular item $i_1$, wherein each of the matrix elements can be multiplied with a corresponding similarity factor. This similarity factor may be the similarity value determined in a previous step or a function thereof.

Weight factors $W_{kl}$ can be used in both of the following steps of collaborative filtering: In finding the 'friends' and in computing the recommendations via 'votes'. Accordingly, a weighted user event matrix $N_{kl}$ can be used for both steps. By applying the weight factor $W_{kl}$ in both steps and/or using the weighted user event matrix $N_{kl}$ in both steps, superior results can be achieved with an improved performance.

However, it may be desirable to use the weight factor $W_{kl}$ and/or the weighted user event matrix $N_{kl}$ only in one of the steps. Hence, the weight factor $W_{kl}$ and/or the weighted user event matrix $N_{kl}$ may be used only in the step of finding 'friends', while in the step of giving 'votes', the unweighted user event matrix $M_{kl}$ may be used. Or vice versa, the weight factor $W_{kl}$ and/or the weighted user event matrix $N_{kl}$ may be used only in the step of giving 'votes', while in the step of determining 'friends', the unweighted user event matrix $M_{kl}$ may be used.

The description above is focused on user to user recommendation. However, the same concept can be used in item to item recommendation. Therefore the transpose of user event matrix $M_{kl}$ and the transpose of the weighted user event matrix $N_{kl}$ can be used. The same discussion as above holds, and the mechanism can be applied just the same way.

The method works for both, item-to-item collaborative filtering and user-to-user collaborative filtering. A benefit from the method of the present disclosure is greater in user-to-user collaborative filtering as compared to item-to-item collaborative filtering. The reason for this include changes in the user preference can be captured much better, if older user events are treated as less important.

By using the above described method of the present disclosure, improvements have been observed on a real dataset of a specific database. For instance, an improvement of 50% relative (8% PRC@3 to 12% PRC@3) may be observed by using the method of the present disclosure.

There is only little computational overhead compared to conventional collaborative filtering methods.

Figure 5:
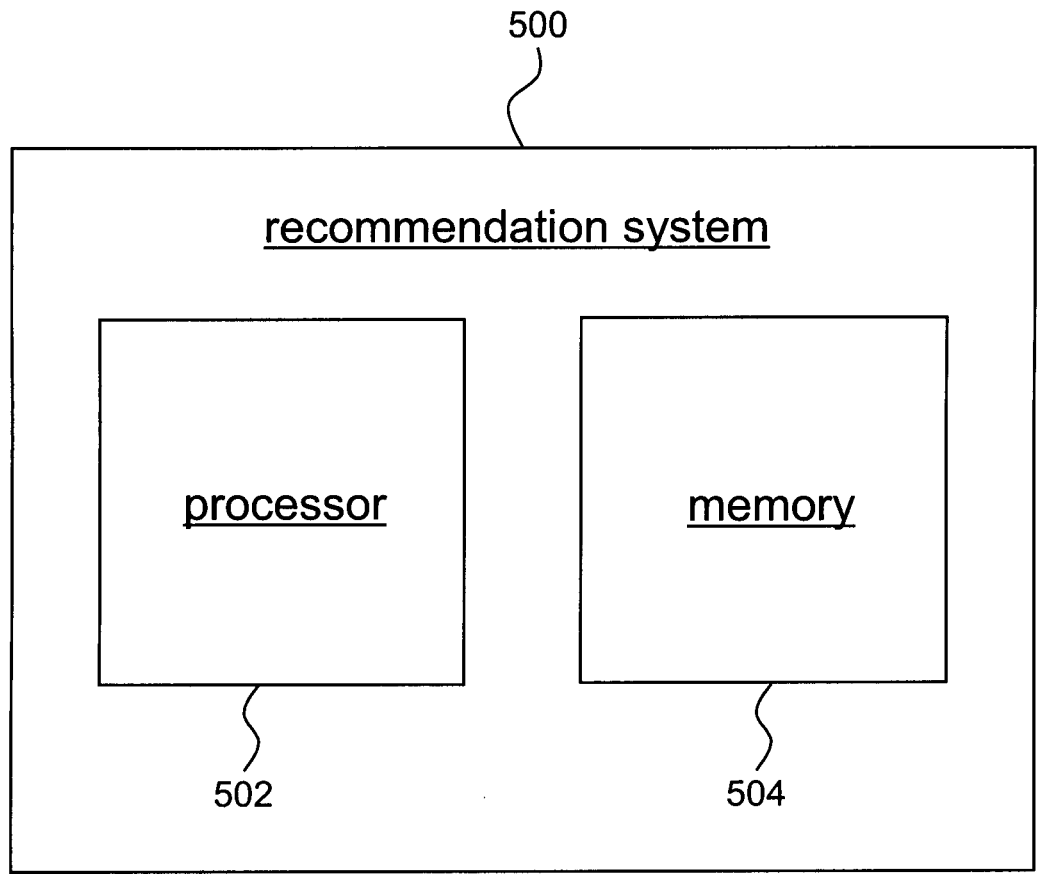
FIG. 5 is a schematic block diagram of a recommendation system according to an embodiment of the present disclosure.

FIG. 5 shows a recommendation system 500 comprising a processor 502 to generate a weighted data set by applying a weight factor to each of a plurality of user event data sets each derived from a previous user event of a second user of the recommendation system, wherein each of the user event data sets includes a user identifier of the second user, an item identifier of an item involved in the previous user event, and time information on the time of the previous user event, and wherein the weight factor can be derived from the time information of the corresponding previous user event; and to determine the one or more recommended items based on an algorithm using the weighted data set. The recommendation system 500 also comprises a memory 504 to store the plurality of user event data sets.

Figure 6:
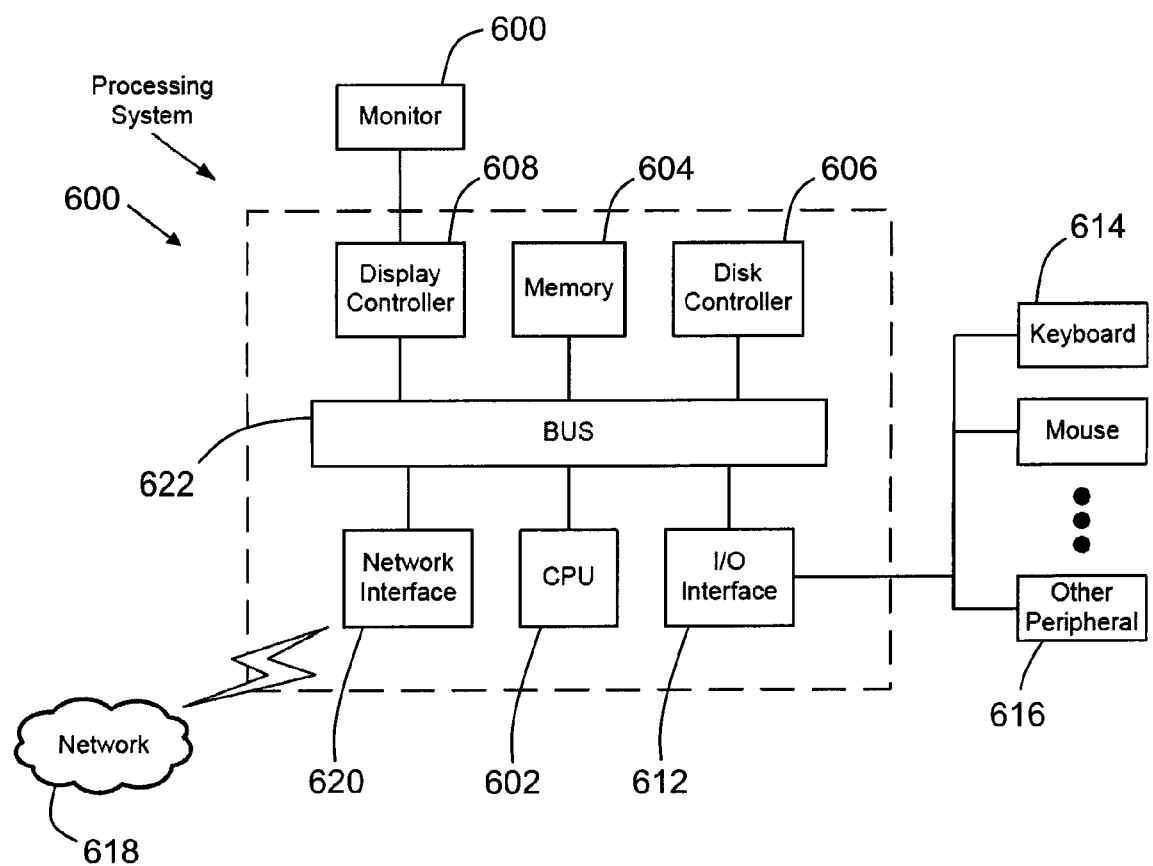
FIG. 6 is a schematic block diagram of a processing system embodying aspects of an embodiment of the present disclosure.

FIG. 6 is a hardware diagram of a processing system 600 embodying aspects of this disclosure, including aspects involving a computer utilized to recommend one or more items among a plurality of items to a first user of a recommendation system. The processing system 600 can communicate with a mobile terminal or device. The processes, algorithms and electronically driven systems described herein can be implemented via a discrete control device or computing system consistent with the structure shown in FIG. 6. Such a system is described herein as a processing system 600.

As shown in FIG. 6, a processing system 600 in accordance with this disclosure can be implemented using a microprocessor or its equivalent, such as a central processing unit 602 (CPU) or at least one application specific processor ASP (not shown). The microprocessor utilizes a computer readable storage medium, such as a memory 604 (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller 606, which can control a hard disk drive or optical disk drive.

The microprocessor or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU 602.

In another aspect, results of processing or the input of data in accordance with this disclosure can be displayed via a display controller 608 to a monitor 610. The display controller 608 can include at least one graphic processing unit for computational efficiency. Additionally, an I/O (input/output) interface 612 may be provided for inputting data from a keyboard 614 or a pointing device (not shown), to control parameters of the various processes and algorithms of this disclosure, can be connected to the I/O interface 612 to provide additional functionality and configuration options, or control display characteristics. Moreover, the monitor 610 can be provided with a touch-sensitive interface to a command/instruction interface, and other peripherals 616 can be incorporated, including a scanner or a web cam when image-based data entry is used.

The above-noted components can be coupled to a network 618, as shown in FIG. 6, such as the Internet or a local intranet, via a network interface 620 for the transmission or reception of data, including controllable parameters. The network 618 provides a communication path to the mobile device, which can be provided by way of packets of data. Additionally, a central BUS 622 is provided to connect the above hardware components together and provides at least one path for digital communication therebetween.

In so far as embodiments of the present disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

Obviously, numerous modifications and variations of the present disclosure are possible in light of the above teachings. It is therefore to be understood that within the scope of the appended claims, the present disclosure may be practiced otherwise than as specifically described herein.

The invention claimed is:

1. A method performed by an information processing apparatus for recommending one or more items among a plurality of items to a first user of a recommendation system, the method comprising:
   deriving, using circuitry of the information processing apparatus, a first weight factor for a plurality of user event data sets from an order of previous user events of a second user;
   generating, using the circuitry, a weighted data set by applying the first weight factor to each of the plurality of user event data sets each derived from a previous user event of the second user of the recommendation system, wherein
      each of the user event data sets includes a user identifier of the second user, an item identifier of an item involved in the previous user event of the second user, and time information regarding a time of the previous user event of the second user, and
      the first weight factor is derived from the time information of the previous user event of the second user; and
   determining, using the circuitry, the one or more recommended items based on an algorithm using the weighted data set,
   wherein the order of previous user events of the second user is ordered according to most recent user event of the second user to least recent user event of the second user, respective weights for the ordered previous user events of the second user descending from highest weight for the most recent user event to lowest weight for the least recent user event.

2. The method according to claim 1, further comprising:
   deriving, using the circuitry, the first weight factor of the user event data sets from a time difference between a current time and the time of the previous user event of the user event data set.

3. The method according to claim 2, wherein said deriving includes deriving the first weight factor of the user event data sets from an exponential function of the time difference between the current time and the time of the previous user event of the user event data set.

4. The method according to claim 2, wherein said deriving includes deriving the first weight factor of the user event data sets from a linear function of the time difference between the current time and the time of the previous user event of the user event data set.

5. The method according to claim 1, further comprising:
   determining, using the circuitry, similarities between at least one of users of the recommendation system and between items among the plurality of items; and
   determining, using the circuitry, recommendation values for the one or more items based on the determined similarities and based on the weighted data set.

6. The method according to claim 5, wherein said determining similarities includes determining similarities based on the weighted data set.

7. The method according to claim 1, wherein the user events are purchase events.

8. The method according to claim 1, further comprising:
   generating, using the circuitry, a matrix based on the plurality of user event data sets; and
   applying, using the circuitry, a second weight factor to one or more elements of the matrix.

9. An information recommendation apparatus comprising:
   circuitry configured to derive a weight factor for a plurality of user event data sets from an order of previous user events of a second user, generate a weighted data set by applying the weight factor to each of the plurality of user event data sets, each derived from a previous user event of the second user of the apparatus, wherein each of the user event data sets includes a user identifier of the second user, an item identifier of an item involved in the previous user event of the second user, and time information regarding a time of the previous user event of the second user, and the weight factor is derived from the time information of the previous user event of the second user;

determine one or more recommended items based on an algorithm using the weighted data set; and store the plurality of user event data sets in a memory, wherein the order of previous user events of the second user is ordered according to most recent user event of the second user to least recent user event of the second user, a weight assigned to the most recent user event of the second user being higher than any other weight assigned to other ordered previous user events, including said least recent user event of the second user.

10. The information recommendation apparatus according to claim 9, wherein the circuitry is configured to store the weighted data set in the memory.

11. A non-transitory computer-readable storage medium storing computer-readable instructions that, when executed by a computer of a recommendation apparatus, cause the recommendation apparatus to perform a method comprising:

deriving a weight factor for a plurality of user event data sets from an order of previous user events of a second user;

generating a weighted data set by applying the weight factor to each of the plurality of user event data sets, each derived from a previous user event of the second user of a recommendation system, wherein each of the user event data sets includes a user identifier of the second user, an item identifier of an item involved in the previous user event of the second user, and time information regarding a time of the previous user event of the second user, and the weight factor is derived from the time information of the previous user event of the second user; and determining one or more recommended items based on an algorithm using the weighted data set, wherein the order of previous user events of the second user is ordered according to most recent user event of the second user to least recent user event of the second user.

\* \* \* \* \*